United States Patent [19]

Burgin

[11] 4,083,620
[45] Apr. 11, 1978

[54] VEHICLE RADIO MOUNT

[76] Inventor: Ralph C. Burgin, P. O. Box 272, West Point, Iowa 52656

[21] Appl. No.: 717,620

[22] Filed: Aug. 26, 1976

[51] Int. Cl.² .............................................. H01R 13/59
[52] U.S. Cl. .................................. 339/91 R; 70/58; 248/203
[58] Field of Search ........................... 339/75 R, 91 R; 248/203; 70/58, DIG. 57

[56] References Cited

U.S. PATENT DOCUMENTS 3,513,478  5/1970  Kemper et al. .................... 339/91 R

OTHER PUBLICATIONS

CB Slide Mount Exhibit, filed Nov. 29, 1976, Superior Industries, Dallas, Tex.

*Primary Examiner*—Roy Lake
*Assistant Examiner*—E. F. Desmond
*Attorney, Agent, or Firm*—Gust, Irish, Jeffers & Rickert

[57] ABSTRACT

A vehicle radio mount having a first member adapted to be mounted to the underside of a vehicle dashboard and having two opposed elongate transversely spaced parallel slide elements. A plurality of exposed conductive contacts are mounted in downwardly facing position in the first member and are connectible to respective vehicle power supply, amplifier, speaker, antenna and other circuits. A locking ridge is formed in downwardly facing position in the first member. A second member, adapted to be connected to a vehicle radio, has a pair of parallel elongate transversely spaced slide receiving grooves which correspond to and are registrable with the slide elements in the first member. A stop is formed at the end of each groove. A tab carrying a locking boss is resiliently cantilevered to the second member and extends adjacent to and is manually accessible to a manual gripping portion on the second member. The locking boss is snappable in locking relation to the ridge on the first member when the first member slide members abut the stops in the second member. The second member carries on resiliently mounted fingers electrical contacts which are registrable with corresponding contacts on the first member when the second member is in its locked position on the first member. The second member electrical contacts are connectible to the radio circuits corresponding to the vehicle circuits.

3 Claims, 9 Drawing Figures

U.S. Patent     April 11, 1978     4,083,620
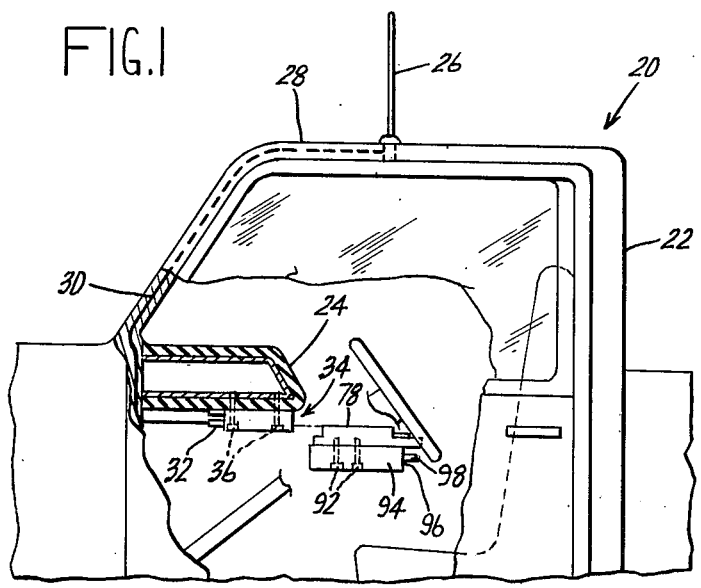
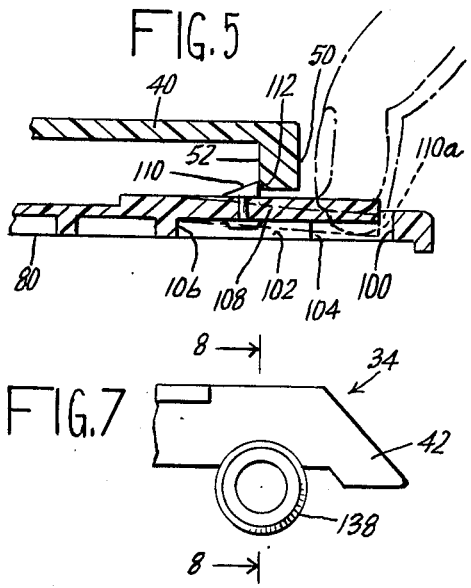
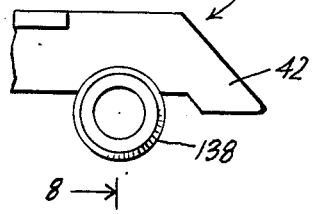
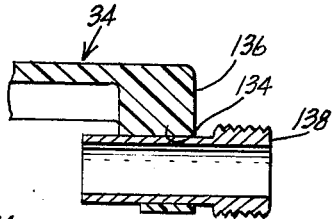
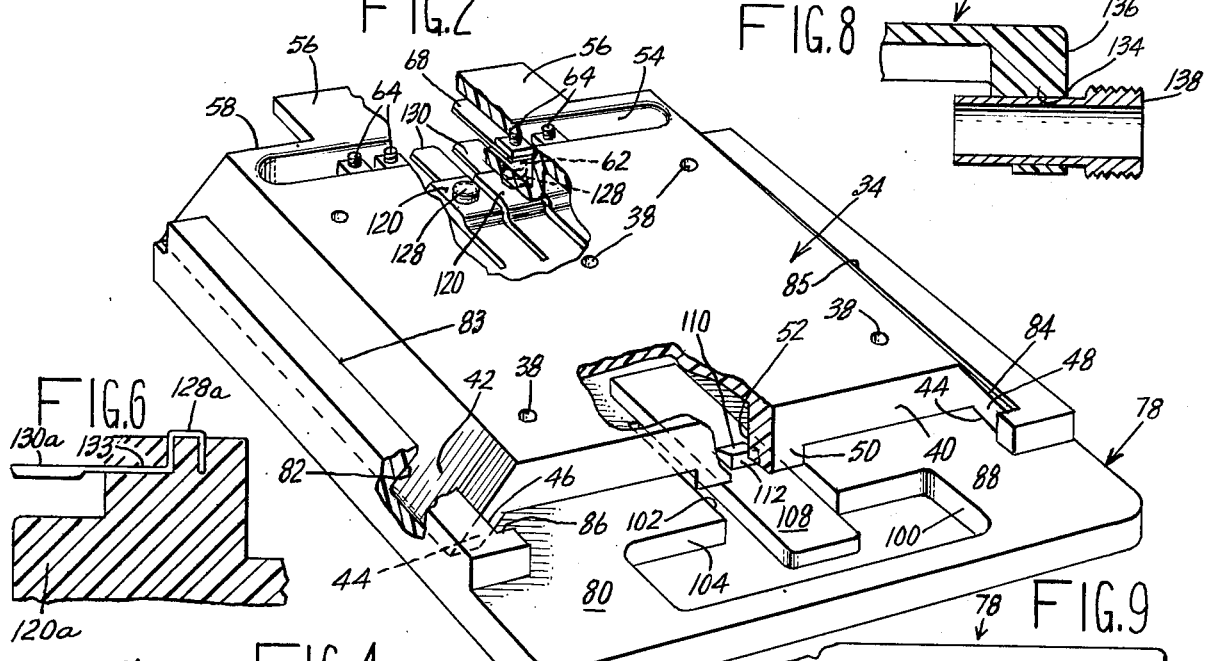
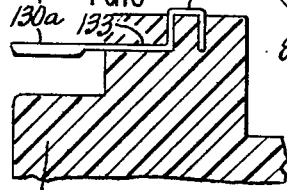
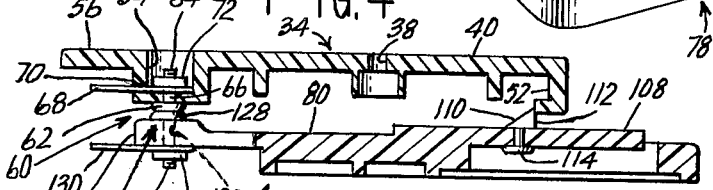
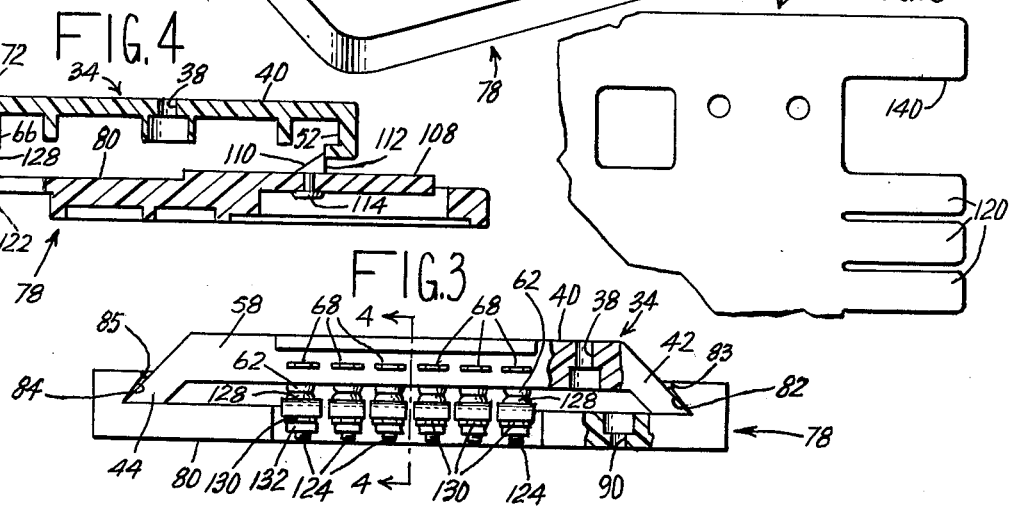

VEHICLE RADIO MOUNT

BACKGROUND OF THE INVENTION

1. Field of the Invention

This invention is in the field of mounting apparatus for vehicle radios and more particularly to such apparatus which is easily and quickly demountable.

2. Brief Statement of the Prior Art

Mounting apparatus is available for portable radios in vehicle compartments. These apparatus include collapsible radio mounts having electrical connections to the vehicle speaker, amplifier, and antenna circuits on the front of a vehicle dashboard. The mount when not in use is foldable against the dashboard and when in use carries the portable radio vertically against the dashboard. Further, in other systems, apertures have been contoured in the dashboard which are exposed when the radio is dismounted or require a displaceable covering. Such mounts are relatively expensive and have numerous moving parts and are within view and unattractive to the vehicle occupants. Further, the location and configuration of the holder presents an unacceptable safety hazard to the occupants of the vehicle front seat. Those models which are attachable in a manner to conceal the radio and to remove the radio from a hazardous position and which do not have hazardous corner projections, are not provided with easily detachable and releasable lockable means.

BRIEF SUMMARY OF THE INVENTION

This invention provides a first member which has openings to receive fasteners for rigid and secure mounting to the underside of a vehicle dashboard. The first member is provided with a pair of parallel, elongate, transversely spaced slides. The first member is also provided with a transverse locking ridge.

A plurality of electrical contacts are mounted in downwardly facing position on the first member and are provided with connectors which can be attached to electrical leads leading to the vehicle power supply, amplifier, speaker, antenna, and other electrical components mounted in the vehicle.

A second member which has a plurality of openings for receiving fasteners for secure and rigid mounting to a vehicle radio, is provided with a pair of parallel elongate transversely spaced slide receiving grooves which correspond to and are registrable with the slides in the first member. Each groove is provided with a slide engaging stop. The forward portion of the first member is provided with a transverse opening for receiving the operator's hand and provides for sliding manipulation of the second member relative the first member. Located centrally of the opening is a tab which is resiliently cantilevered to the second member at a point distal from the opening and which carries a locking boss. The slides of the first member are insertable and slidable in the receiving grooves of the second member until the slides abut the respective stops in the slide receiving grooves, at which time the locking boss is snappable under the locking ridge thereby preventing longitudinal movement in either direction of the second member relative the first member. The second member also carries a plurality of electrical contacts each of which is provided with connector means for connecting leads to the radio circuitry such as the power input, the tuner or amplifier output, the speaker output, and the antenna input. These electrical contacts are mounted on resilient fingers of the second member and are registrable with the corresponding contacts mounted in the first member when the second member is in mounted, locked position relative the first member.

To remove the second member to which the radio is attached from the first member, it is only necessary to depress the locking tab and pull outwardly on the manually accessible opening, which opening also provides a convenient handle for carrying the second member and radio. Thus, the second member can be unlocked and completely removed from the first member with a quick, one hand operation to facilitate carriage of the radio by the operator upon leaving of the vehicle, thereby minimizing radio loss due to theft. Further, the radio body in the mounted locked position is concealed from sight and placed in a non-hazardous position underneath the vehicle dashboard. At the same time, the radio controls and tuning panel are in a recessed yet manually accessible and viewable position as is the handle and locking tab. The first and second members which comprise the mounting apparatus are of low profile, thus keeping the radio close to the underside of the vehicle dashboard, the apparatus provides positive, sight-free positioning; has minimum alignment requirements and is lockable in a mounted position which insures electrical contact registration and connection between the respective contacts; is sturdy; durable; rigid; with the first and second members being of one piece, low cost construction.

It is therefore an object of this invention to provide a vehicle radio mounting apparatus that is economical of manufacture, sturdy, durable, and has a low profile.

It is a further object of this invention to provide an apparatus of the foregoing object which provides a releasable lockable mounting of one member to a second member that may be completely operated with one hand and is in a safe, recessed, concealed position relative the vehicle occupants.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE DRAWINGS

FIG. 1 is a partial, partially sectioned, view of a vehicle having the radio mounting apparatus of this invention shown therein with the radio shown in a dismounted position;

FIG. 2 is a partially sectioned, partially broken-away view in perspective of a mounting apparatus of this invention shown in the mounted position;

FIG. 3 is a partially broken-away rear elevational view of the embodiment shown in FIG. 2;

FIG. 4 is a partial sectional view taken at 4—4 of FIG. 3;

FIG. 5 is a partial sectional view of the locking ridge and locking boss shown in both the locked and unlocked positions;

FIG. 6 is a partial sectional view of an alternate embodiment showing the mounting of an electrical connector;

FIG. 7 is a partial rear elevational view of the vehicle mounted first member of an alternate construction;

FIG. 8 is a section taken at 8—8 of FIG. 7; and

FIG. 9 is a partial top plan view of the radio mounted first member of the construction of FIGS. 7 and 8.

DESCRIPTION OF THE PREFERRED EMBODIMENTS

Referring to FIGS. 1-6, a vehicle 20 has a cab 22 wherein there is mounted a vehicle dashboard 24 in a conventional manner. An antenna 26 is mounted to the roof 28 of cab 22 and an electrical conductor 30 connects antenna 26 to a lead 32, which is in the form of a female socket connector well known in the art and which is mounted in fixed relation to dashboard 24. A first member 34 is fastened, as by bolts 36 which extend through openings 38 formed in panel 40 of member 34. Member 34 may be made of a molded, rigid, insulative material such as plastic. Elongate parallel slides 42 and 44 extend angularly outwardly from panel 40 and have rearward facing surfaces 46, 48 respectively. Formed at, and depending from, the rearward edge of panel 40 is a locking ridge 50 having locking surface 52 formed on the forward face thereof.

A channel 54 is formed transversely near the forward edge of panel 40 and an alignment ledge 56 extends forwardly from the forward edge 58 of panel 40 and acts as an alignment guide for electrical sockets 32. A plurality of bolts 60 (FIG. 4) formed of an electrically conductive metal such as copper or brass, each have a conductive head 62 and a threaded shank 64 which is inserted through a corresponding opening 66 in the bottom surface of channel 54 and inserted through an opening formed in one end of conductive lug 68 which extends through corresponding openings 70 in the forward wall of channel 54. A nut 72 is then threaded onto shank 64 securing bolt 60 and lug 68 firmly in place relative member 34. Lug 68 is insertable in a female socket connector 32 in electrically conductive relation, as is well known in the art. As many bolts 60 may be placed in channel 54 as desired to make connections to the vehicle electrical circuits such as the power circuits to the vehicle battery, an amplifier circuit that may be installed in the vehicle dashboard 24, antenna lead 30, or other circuits that are located in the vehicle. It is to be understood that contacts 62 and lugs 68 may be formed of a conductive unitary member that may be molded in member 34, in a manner similar to that shown in FIG. 6, later described.

A second member 78, which also may be molded from an insulative, rigid, plastic material, has a panel 80 having formed along the side edges thereof elongate parallel grooves 82 and 84 which receive slides 42 and 44 respectively. Grooves 82 and 84 have elongate opposed apertures 83 and 85, respectively. Slides 42 and 44 extend laterally into apertures 83 and 85 respectively to restrain relative lateral movement between members 34 and 78. Formed at the forward end of grooves 82, 84 are stop abutments 86, 88, respectively, which engage the forward ends 46, 48 of slide elements 42, 44 respectively when second member 78 is in the mounted position relative first member 34. Panel 80 has a plurality of openings 90 which receive fasteners such as bolts 92 to securely mount member 78 to a vehicle radio 94 having a tuner calibration panel 96 and radio controls 98 at and extending from the rearward end thereof. Panel 80 has a transverse opening 100 at the rearward end thereof which is adapted for manual gripping by the operator, and has a longitudinal slot 102 formed centrally of and extending forwardly of forward face 104. Cantilevered to panel 80 at the front wall 106 of slot 102 is an elongate finger tab 108 which is resiliently depressible and carries a locking boss 110 on the upper surface thereof which has a rearwardly facing locking surface 112 which is engageable with surface 52 on locking ridge 50 when first member 34 and second member 78 are in locked mounted position as shown in FIGS. 2, 4 and 5. Boss 110 is secured to tab 108 as by threaded bolt 114 but, as will be understood by those skilled in the art, boss 110 can be molded onto tab 108 in the manufacture of member 78.

Cantilevered from panel 80 are a plurality of forwardly extending resilient fingers 120 each of which has an opening 122 for receiving the threaded shank of bolts 126, which are similar in construction to bolt 60, and which have a conductive head 128. Shanks 124 are fitted through openings in conductive lugs 130 and a nut 132 is threadedly tightened on shank 124 thus securing bolts 126 and lugs 130 in rigid relationship to fingers 120. It is understood that contacts 128 and strip 130 may be unitary member that is molded in fingers 120, according to techniques well known in the art and exemplified by conductive member 133, FIG. 6, molded in finger 120a and having lug 130a and conductive surface 128a. Contacts 128 are positioned on fingers 120 so that they will be in perfect alignment and registration with contact heads 62 on bolts 60 in member 34 when members 34 and 78 are in their mounted locked positions. Due to the resiliency of fingers 120, the contacts 62 and 128 are in a compressive conductive relationship and are self-cleaning as member 78 slides into its mounted position relative member 34. Lugs 130 are insertable into female conductive sockets, not shown, but similar to socket 32, which are connected to the end of radio 94 leads, not shown, so that the respective power, amplifier, antenna, and other circuits in the vehicle and radio are properly established when the members 34 and 78 are in their mounted locked position. The respective connections may be selectively made since the female connectors are removable from and insertable on any of the lugs 130 as desired.

In the operation of the embodiment shown in FIGS. 1-6, member 34 is securely fastened to the underside of dash 24 by means of fasteners 36 and member 78 is securely fastened to radio 94 by means of fasteners 92. The operator then grips member 78 by inserting his fingers in opening 100 and fitting grooves 82 and 84 about slides 42 and 44 and then sliding member 78 toward member 34 until the rearwardly facing surfaces 46 and 48 of slide elements 42 and 44 respectively abut stops 86 and 88 respectively. Just prior to engagement of surfaces 46 and 48 with stops 86 and 88, respectively, locking boss 110 will have been downwardly displaced by ridge 50 causing tab 108 to be moved resiliently downwardly. When surfaces 46 and 48 abut stops 86 and 88, respectively, boss 110 will have cleared ridge 50 and will have snapped upwardly so that surfaces 52 and 112 will be in locked interfacial engagement thus preventing any relative longitudinal movement between members 34 and 78.

Also, just prior to engagement between surfaces 46 and 48 with stops 86 and 88, contacts 62 in member 34 and contacts 128 in member 78 will come into engagement, resiliently depressing downwardly fingers 120. As surfaces 46 and 48 contact stops 86 and 88, respectively, the contacts 62 and 128 will be in aligned registration. Thus, in one movement, members 34 and 78 can be assembled in releasably lockable relation with their respective contacts in perfect registration and electrical communication.

On removal of member 78 from member 34, as will be desired when the operator leaves the vehicle for any period of time, the operator may manually grip member 78 by inserting the fingers of one hand in opening 100 while at the same time finger depressing tab 108, FIG. 5, until locking boss 110 assumes the position 110a so that surfaces 52 and 112 become disengaged, permitting sliding removal of member 78 from member 34. Thus, the radio can be easily and readily removed from the vehicle dashboard with one hand operation. Referring to FIG. 2, it is seen that the mounting apparatus is of exceptionally low profile so that it has a minimum vertical dimension; is of sturdy construction; can be manufactured inexpensively; and has a simple, releasable locking relationship between the members 34 and 78.

Referring to FIGS. 7-9, it is seen that a standard coaxial cable connector can also be mounted to member 34. In this embodiment, a circular opening 134 is provided adjacent the forward edge 136 of member 34 for receiving a conductive metallic coaxial connector 138 in close frictional engagement. Member 78, FIG. 9, is provided with a clearance 140 adjacent fingers 120 for receiving connector 138 when members 34 and 78 are in mounted locked position. Thus, in those instances where desired, a coaxial connector can be utilized.

While there have been described above the principles of this invention in connection with specific apparatus, it is to be clearly understood that this description is made only by way of example and not as a limitation to the scope of the invention.

What is claimed is:

1. Vehicle radio-mounting apparatus comprising first and second essentially flat members removably assembled together in superposed relation; said first member having on two opposite edge portions thereof elongated, straight divergent mounting flanges; said second member having on two opposite edge portions thereof elongated slots open at one end and closed at the other ends and shaped slidably to receive said flanges, respectively, through said open end; first and second slidably engageable electrical contacts on said first and second members, respectively; first means on one of said first and second members carrying one of said contacts and yieldably urging it into engagement with said second contact; second means for releaseably locking said members in assembled relation; said second means including abutment portions on said second member which close said other ends of said slots, respectively; one end of said flanges being engageable with said abutment portions, respectively; a first locking portion on said first member extending toward said second member; a second locking portion on said second member supported manually to engage said first locking portion thereby to lock said first member against removal from said slot when said flanges engage said abutment portions; a cantilever resiliently mounted on said second member and carrying said second locking portion; said second locking portion having an upper cam surface inclined in a direction from said one end toward said other end of said slots; a portion on said second member extending beyond said first member which serves as a handle removing said second member from said first member upon disengaging said first and second locking portions; said handle having an opening therethrough; said cantilever extending into said opening which extends laterally therebeyond to provide clearance for inserting the fingers of an operator's hand therethrough whereby said cantilever may be manipulated to disengage said first and second locking portions while manually grasping said handle.

2. Vehicle radio-mounting apparatus comprising first and second essentially flat members removably assembled together in superposed relation; said first member having on two opposite edge portions thereof elongated, straight divergent mounting flanges; said second member having on two opposite edge portions thereof elongated slots open at one end and closed at the other ends and shaped slidably to receive said flanges, respectively, through said open end, first and second slidably engageable electrical contacts on said first and second members, respectively; first means on one of said first and second members carrying one of said contacts and yieldably urging into engagement with said second contact; second means for releaseably locking said members in assembled relation; said first means comprising a resilient electrically insulative cantilever integrally connected at one end to one of said first and second members; said cantilever carrying said one contact on the end portion thereof; said contacts being disengageable upon sliding said first and second members apart.

3. The apparatus of claim 2 including a rigid supporting device having means for removably receiving said first member thereto; an electronic device removably attached to and carried by said second member; said first contact having a rigid terminal extending therefrom for attachment to circuitry carried by said supporting device; said second contact also having a rigid terminal extending therefrom for attachment to circuitry in said electronic device; said first and second members being of plastic material; at least one of said contacts being an integral part of the respective rigid terminal exposed beyond the respective first and second member; the remainder of the last mentioned terminal being securely embedded in and extending from the respective first and second member.

* * * * *